US00RE49330E

(19) United States
(12) Reissued Patent
Sim et al.

(10) Patent Number: US RE49,330 E
(45) Date of Reissued Patent: *Dec. 6, 2022

(54) METHOD AND APPARATUS FOR ADAPTIVELY ENCODING AND DECODING A QUANTIZATION PARAMETER BASED ON A QUADTREE STRUCTURE

(71) Applicant: Dolby Laboratories Licensing Corporation, San Francisco, CA (US)

(72) Inventors: Dong Gyu Sim, Seoul (KR); Jung Hak Nam, Seoul (KR); Hyung Ho Jo, Seoul (KR)

(73) Assignee: Dolby Laboratories Licensing Corporation, San Francisco, CA (US)

( * ) Notice: This patent is subject to a terminal disclaimer.

(21) Appl. No.: 16/407,669

(22) Filed: May 9, 2019

Related U.S. Patent Documents

Reissue of:
(64) Patent No.: 9,066,098
Issued: Jun. 23, 2015
Appl. No.: 14/585,946
Filed: Dec. 30, 2014

U.S. Applications:
(63) Continuation of application No. 14/815,325, filed on Jul. 31, 2015, now Pat. No. Re. 47,465, which is an
(Continued)

(30) Foreign Application Priority Data

Jun. 21, 2011 (KR) ..... 10-2011-0060058

(51) Int. Cl.
*H04N 7/14* (2006.01)
*H04N 19/126* (2014.01)
(Continued)

(52) U.S. Cl.
CPC ..... *H04N 19/126* (2014.11); *H04N 19/176* (2014.11); *H04N 19/463* (2014.11);
(Continued)

(58) Field of Classification Search
CPC ..... H04N 19/70; H04N 19/50; H04N 19/126; H04N 19/154; C08K 5/3435; C08L 97/00
See application file for complete search history.

(56) References Cited

U.S. PATENT DOCUMENTS 8,315,310 B2 * 11/2012 Shi ..... H04N 19/139 375/240.16
8,964,834 B2 2/2015 Sim et al.
(Continued)

FOREIGN PATENT DOCUMENTS

CN 101232618 A 7/2008
CN 101317458 A 12/2008
(Continued)

OTHER PUBLICATIONS

Japan Patent Office, Application No. 2020-001540, Office Action dated Feb. 2, 2021.
(Continued)

*Primary Examiner* — Linh M Nguyen
(74) *Attorney, Agent, or Firm* — Wong & Rees LLP; Zhichong Gu

(57) ABSTRACT

Disclosed are an apparatus and a method of encoding/decoding a video, particularly a method and an apparatus for storing a quantization parameter differential value in a largest coding unit (LCU) based on quadtree splitting and adaptively predicting a quantization parameter value based on context information on neighboring CUs. Quadtree-based quantization parameter encoding and decoding methods and apparatuses effectively show information on a block having a quantization parameter differential value based on splitting information on a CU and adaptively predict a quantization parameter value using context information including a block size, block partition and a quantization parameter of a neighboring CU.

6 Claims, 20 Drawing Sheets

Related U.S. Application Data application for the reissue of Pat. No. 9,066,098, which is a continuation of application No. 14/096,211, filed on Dec. 4, 2013, now Pat. No. 8,964,834, which is a continuation of application No. PCT/KR2012/004881, filed on Jun. 20, 2012.

(51) Int. Cl.

| | |
|---|---|
| ***H04N 19/176*** | (2014.01) |
| ***H04N 19/50*** | (2014.01) |
| ***H04N 19/463*** | (2014.01) |
| ***H04N 19/593*** | (2014.01) |
| ***H04N 19/70*** | (2014.01) |
| ***H04N 19/96*** | (2014.01) |

(52) U.S. Cl.

CPC ..... *H04N 19/50* (2014.11); *H04N 19/593* (2014.11); *H04N 19/70* (2014.11); *H04N 19/96* (2014.11)

(56) References Cited

U.S. PATENT DOCUMENTS

| | | | | |
|---|---|---|---|---|
| 8,989,256 | B2 * | 3/2015 | Wilkins | H04N 19/103 375/240 |
| 9,066,098 | B2 | 6/2015 | Sim et al. | |
| RE46,678 | E | 1/2018 | Sim et al. | |
| 2005/0175093 | A1 * | 8/2005 | Haskell et al. | 375/240.03 |
| 2005/0180502 | A1 * | 8/2005 | Puri | 375/240.03 |
| 2008/0240250 | A1 * | 10/2008 | Lin et al. | 375/240.18 |
| 2009/0010557 | A1 | 1/2009 | Zheng et al. | |
| 2011/0274162 | A1 * | 11/2011 | Zhou et al. | 375/240.03 |
| 2014/0161177 | A1 | 6/2014 | Sim et al. | |
| 2015/0117522 | A1 | 4/2015 | Sim et al. | |

FOREIGN PATENT DOCUMENTS

| | | | |
|---|---|---|---|
| CN | 101796847 | A | 8/2010 |
| CN | 101816182 | A | 8/2010 |
| CN | 101903945 | A | 12/2010 |
| CN | 101978697 | A | 2/2011 |
| CN | 102027746 | A | 4/2011 |
| CN | 102036068 | A | 4/2011 |
| CN | 103931190 | A | 7/2014 |
| JP | 2012191294 | A | 10/2012 |
| JP | 2013-529021 | A | 7/2013 |
| JP | 2013-529045 | A | 7/2013 |
| JP | 2013-542689 | A | 11/2013 |
| JP | 2014-506752 | A | 3/2014 |
| JP | 6185461 | B2 | 8/2017 |
| JP | 6388690 | B2 | 9/2018 |
| KR | 10-2008-0004855 | A | 1/2008 |
| KR | 10-2010-0087600 | A | 8/2010 |
| KR | 10-2011-0015002 | A | 2/2011 |
| WO | 2005009050 | A1 | 1/2005 |
| WO | 2009158113 | A2 | 12/2009 |
| WO | WO 2009/158113 | A2 | 12/2009 |
| WO | 2010058895 | A2 | 5/2010 |
| WO | 2011054926 | A1 | 5/2011 |
| WO | 2011055908 | A2 | 5/2011 |
| WO | 2011064926 | A1 | 6/2011 |
| WO | WO 2011/064926 | A1 | 6/2011 |
| WO | 2011140211 | A2 | 11/2011 |
| WO | WO 2011/140211 | A2 | 11/2011 |
| WO | 2012023806 | A2 | 2/2012 |
| WO | WO 2012/023806 | A2 | 2/2012 |
| WO | 2012042890 | A1 | 4/2012 |
| WO | WO 2012/042890 | A1 | 4/2012 |
| WO | 2012062161 | A1 | 5/2012 |
| WO | WO 2012/062161 | A1 | 5/2012 |
| WO | 2012102867 | A1 | 8/2012 |
| WO | WO 2012/102867 | A1 | 8/2012 |
| WO | 2012122798 | A1 | 9/2012 |

OTHER PUBLICATIONS

"Test Model Under Construction", Joint Collaborative Team On Video Coding (JCT-VC) Of ITU-T SG16 WP3 And ISO/IEC JTC1/SC29/WG11, 1st Meeting: Dresden, DE, Apr. 15-23, 2010.

McCann et al., "Samsung's Response To The Call For Proposals On Video Compression Technology", Joint Collaborative Team On Video Coding (JCT-VC) Of ITU-T SG16 WP3 And ISO/IEC JTC1/SC29/WG11, 1st Meeting Dresden, DE, Apr. 15-23, 2010.

Aoki et al., "Prediction-Based QP Derivation", Joint Collaborative Team On Video Coding (JCT-VC) Of ITU-T SG16 WP3 And ISO/IEC JTC1/SC29/WG11, 5th Meeting: Geneva, CH, Mar. 16-23, 2011.

Budagavi et al., "Delta QP Signaling At Sub-LCU Level", Joint Collaborative Team On Video Coding (JCT-VC) Of ITU-T SG16 WP3 And ISO/IEC JTC1/SC29/WG11, 4th Meeting: Daegu, KR, Jan. 20-28, 2011.

Chuang et al., "AhG Quantization: Sub-LCU Delta QP", Joint Collaborative Team On Video Coding (JCT-VC) Of ITU-T SG16 WP3 And ISO/IEC JTC1/SC29/WG11, 5th Meeting: Geneva, CH, Mar. 16-23, 2011.

Coban et al., "CU-Level QP Prediction", Joint Collaborative Team On Video Coding (JCT-VC) Of ITU-T SG16 WP3 And ISO/IEC JTC1/SC29/WG11, 5th Meeting: Geneva, CH, Mar. 16-23, 2011.

Kobayashi et al., "Sub-LCU Level Delta QP Signaling", Joint Collaborative Team On Video Coding (JCT-VC) Of ITU-T SG16 WP3 And ISO/IEC JTC1/SC29/WG11, 5th Meeting: Geneve, CH, Mar. 16-23, 2011.

Pang et al., "Sub-LCU QP Representation", Joint Collaborative Team On Video Coding (JCT-VC) Of ITU-T SG16 WP3 And ISO/IEC JTC1/SC29/WG11, 5th Meeting: Geneva, CH, Mar. 16-23, 2011.

United States Patent and Trademark Office, U.S. Appl. No. 14/815,325, Non-Final Office Action dated Apr. 13, 2018.

United States Patent and Trademark Office, U.S. Appl. No. 14/815,325, Non-Final Office Action dated Sep. 20, 2018.

United States Patent and Trademark Office, U.S. Appl. No. 14/815,325, Notice of Allowance dated Feb. 6, 2019.

Coban, Muhammed, et al. "CU-Level QP Prediction", Proceedings from the 5th Meeting of the Joint Collaborative Team on Video Coding (JCT-VC) of ITU-T SG16 WP3 and ISO/IEC JTC1/SC29/WG11, meeting held on Mar. 16-23, 2011, Geneva, Switzerland, (3 pages, in English).

K., Sato, et al. "Description of Core Experiment 4: Quantization", Proceedings from the 5th Meeting of the Joint Collaborative Team on Video Coding (JCT-VC) of ITU-T SG16 WP3 and ISO/IEC JTC1/SC29/WG11, meeting held on Mar. 16-23, 2011, Geneva, Switzerland, (9 pages, in English).

Search Report issued Dec. 18, 2012 in counterpart International Application No. PCT/KR2012/00488l. (5 pages including English Translation).

M. Budagavi et al., "Delta QP signaling at sub-LCU level," document JCTVC-D038 submitted at the 4th Meeting of the Joint Collaborative Team on Video Coding (JCT-VC) of ITU-T SG16 WP3 and ISO/IEC JTC1/SC29/WG11 held at Daegu, Republic of Korea, Jan. 20-28, 2011, pp. 1-5.

H. Aoki e al., "Prediction-based QP derivation," document JCTVC-E215 submitted at the 5th Meeting of the Joint Collaborative Team on Video Coding (JCT-VC) of ITU-T SG16 WP3 and ISO/IEC JTC1/SC29/WG11 held at Geneva, Switzerland, Mar. 16-23, 2011, pp. 1-11.

T.-D. Chuang et al., "AhG Quantization: Sub-LCU Delta QP," document JCTVC-B-051 submitted at the 5th Meeting of the Joint Collaborative Team on Video Coding (JCT-VC) of ITU-T SG16 WP3 and ISO/IEC JTC1/SC29/WG11 held at Geneva, Switzerland, Mar. 16-23, 2011, pp. 1-6.

M. Kobayashi et al., "Sub-LCU level delta QP signaling," document JCTVC-E198 submitted at the 5th Meeting of the Joint Collaborative Team on Video Coding (JCT-VC) of ITU-T SG16 WP3 and ISO/IEC JTC1/SC29/WG11 held at Geneva, Switzerland, Mar. 16-23, 2011, pp. 1-9.

(56) References Cited

OTHER PUBLICATIONS

C. Pang et al., "Sub-LCU QP representation," document JCTVC-B436 submitted at the 5th Meeting of the Joint Collaborative Team on Video Coding (JCT-VC) of ITU-T SG16 WP3 and ISO/IEC JTC1/SC29/WG11 held at Geneva, Switzerland, Mar. 16-23, 2011, pp. 1-5.

* cited by examiner

FIG. 3

| seq_parameter_set_rbsp() | Descriptor |
| --- | --- |
| **cu_qp_delta_enabled_flag** | u(1) |

300

FIG. 4A

| slice_data() | Descriptor |
|---|---|
| CurrTbAddr=first_tb_in_slice<br>do {<br>xCU=HorLumaLocation(CurrTbAddr)<br>yCU=VerLumaLocation(CurrTbAddr)<br><br>400 IsCuQpDeltaCoded=0<br>401 coding_tree(xCU, yCU, Log2TbSize, 1)<br>...<br>CurrTbAddr=NextTbAddress(CurrTbAddr)<br>} While(moreDataFlag) | |

FIG. 4B

421

| coding_tree(x0, y0, log2CUSize, cu_qp_delta_exist_flag) | Descriptor |
|---|---|
| ... | |
| split_coding_unit_flag[x0][y0] | |
| ... | |
| if(split_coding_unit_flag[x0])[y0]) | |
| { | |
| if(cu_qp_delta_enabled_flag&&cu_qp_delta_exist_flag) | |
| { | |
| **split_qp_delta_flag** | |
| if(split_qp_delta_flag==0) | |
| IsCuQpDeltaCoded=0; | |
| cu_qp_delta_exist_flag=split_qp_delta_flag | |
| } | |
| x1=x0+((1<<log2CUSize)>>1) | u(1) \| ae(v) |
| y1=y0+((1<<log2CUSize)>>1) | |
| coding_tree(x0, y0, log2CUSize-1, cu_qp_delta_exist_flag) | |
| if(x1<PicWidthInSamlples$_L$ ) | |
| coding_tree(x1, y0, log2CUSize-1, cu_qp_delta_exist_flag) | |
| if(y1<PicWidthInSamlplesL) | |
| coding_tree(x0, y1, log2CUSize-1, cu_qp_delta_exist_flag) | |
| if(x1<PicWidthInSamlplesL && y1<PicHeightInSamplesL) | |
| coding_tree(x1, y1, log2CUSize-1, cu_qp_delta_exist_flag) | |
| } | |
| else | |
| { | |
| coding_unit(x0, y0, log2CUSize, cu_qp_delta_exist_flag) | |
| } | |

420

422

FIG. 5

500

| coding_tree(x0, y0, log2CUSize, cu_qp_delta_exist_flag) | Descriptor |
|---|---|
| If(skip_flag[x0][y0])<br>{<br>...<br>}<br>else<br>{<br>if((cu_qp_delta_enabled_flag&&cu_qp_delta_exist_flag) \| \|<br>(cu_qp_delta_enabled_flag&& ! IsCuQpDeltaCoded))<br>{<br>**cu_qp_delta**<br>IsCuQpDeltaCoded=1;<br>}<br>} | se(v) \| ae(v) 501 |

METHOD AND APPARATUS FOR ADAPTIVELY ENCODING AND DECODING A QUANTIZATION PARAMETER BASED ON A QUADTREE STRUCTURE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE *TO RELATED APPLICATIONS; BENEFIT CLAIM*

[This] *More than one Reissue Application has been filed for the reissue of U.S. Pat. No. 9,066,098, issued on Jun. 23, 2015. The reissue applications are application Ser. Nos. 14/815,325, filed on Jul. 31, 2015 (now U.S. Pat. No. RE47,465, issued on Jun. 25, 2019); 14/815,532, filed on Jul. 31, 2015 (now U.S. Pat. No. RE46,678, issued on Jan. 16, 2018); and 16/407,669 (the present application), filed on May 9, 2019. The present* application *claims the benefit as a Reissue Continuation Application of U.S. application Ser. No. 14/815,325, filed Jul. 31, 2015, which is a Reissue Application from U.S. Pat. No. 9,066,098 issued on Jun. 23, 2015 and filed Dec. 30, 2014, which* is a Continuation Application of U.S. application Ser. No. 14/096,211, filed on Dec. 4, 2013 (*now U.S. Pat. No. 8,964,834, issued on Feb. 24, 2015*), which is a Continuation Application of PCT Application No. PCT/KR2012/004881, filed on Jun. 20, 2012 and published as WO 2012/177051 on Dec. 27, 2012, which claims priority to Korean Patent Application No. 10-2011-0060058, filed on Jun. 21, 2011 in the Korean Intellectual Property Office, the entire disclosures of which are incorporated herein by reference for all purposes. *Applicants hereby rescind any disclaimer of claim scope in the parent application(s) or the prosecution history thereof and advise the USPTO that the claims in this application may be broader than any claim in the parent application(s).*

TECHNICAL FIELD

The present invention relates to an apparatus and a method of encoding/decoding a video, and more particularly, to a video encoding/decoding method and apparatus which displays a block having a quantization/dequantization differential value based on a quadtree with respect to coding units (CUs) in a largest coding unit (LCU) and adaptively predicts/decodes a quantization/dequantization parameter value using context information on blocks neighboring to a block to encode/decode.

High Efficiency Video Coding (HEVC) encodes/decodes an input picture by a coding unit (CU). A CU with a largest size in a frame is referred to as a largest coding unit (LCU), which is split into a plurality of CUs based on quadtree splitting information for encoding/decoding. In HEVC, one quantization parameter value is allocated to an LCU, and a quantization parameter value for a current LCU to encode is predicted from a previous LCU according to raster scan order.

BACKGROUND ART

In H.265/AVC, encoding/decoding is carried out on a macroblock unit, and a quantization/dequantization value is allocated to each macroblock. A quantization parameter value allocated to each macroblock is predicted from a quantization parameter value of a macroblock located on the left in a frame. A differential value which is generated after prediction of the quantization parameter value is written in a macroblock to encode, thereby conducting encoding. A decoder decodes the quantization parameter value by adding the quantization parameter differential value decoded in entropy decoding and the quantization parameter value of the left macroblock.

However, when a large LCU is allocated as compared with a size of an input picture, a bit rate may not be effectively controlled using a quantization parameter value stored by an LCU. Further, when a quantization parameter value is allocated by a CU, subjective deterioration in image quality may occur due to a difference in quantization parameter value from neighboring CUs. Thus, there is a need for a method of allocating quantization parameter values to various block sizes ranging from a CU to an LCU depending on an input picture and of optimally predicting a quantization parameter using context information on blocks neighboring to a block to encode.

DISCLOSURE

Technical Problem

An aspect of the present invention is to provide a method and an apparatus for encoding/decoding quadtree-based quantization/dequantization parameter values based on splitting information on a CU. The quantization/dequantization parameter encoding/decoding method and apparatus are capable of predicting quantization/dequantization parameter values in an effective manner using context information on neighboring blocks.

Technical problems of the present invention are not limited to those mentioned above, and those skilled in the art may understand additional problems not stated herein based on the following description.

Technical Solution

An embodiment of the present invention provides a video encoding apparatus which includes a quantization differential value storing block unit determination module to determine a block unit to store a quantization parameter (QP) differential value in splitting a largest coding unit (LCU) of a picture into a plurality of CUs in a quadtree or encoding into a single CU, a quantization module to perform quantization using a quantization value allocated to each block unit, a quantization prediction block determination module to adaptively determine a prediction block using context information on a neighboring block so as to predict a quantization value used by a block to encode, a QP differential value generation module to generate a quantization differential value of the block to encode using a QP of the prediction block determined based on the context information, and a QP storage module to store splitting information on a quantization differential value storage block unit and QP differential values of a corresponding block.

Another embodiment of the present invention provides a video decoding apparatus which includes a dequantization parameter differential value block splitting flag deriving module to decode information on a block having a dequantization parameter differential value in an LCU, a dequantization differential value storage block unit determination module to determine the block having the dequantization parameter differential value in the LCU using a decoded dequantization parameter differential value block splitting flag, a dequantization parameter differential value deriving module to decode a dequantization parameter differential value according to the dequantization parameter differential value block splittting flag, a dequantization parameter value prediction block determination module to determine a block used for prediction based on context information on a neighboring block so as to decode a dequantiation parameter value of a block to decode, a dequantization parameter value deriving module to decode the dequantization parameter value used for dequantization, and a dequantization module to perform dequantization using the decoded dequantization parameter value.

Advantageous Effects

Quadtree-based adaptive quantization/dequantization parameter encoding and decoding methods and apparatuses according to exemplary embodiments of the present invention enable allocation of different levels of quantization parameter differential values when a block is split in a quadtree. Such allocation of different levels of quantization parameter differential values allows accurate adjustment of bit rate as compared with allocation of a single quantization parameter value in an LCU. Further, in predicting/decoding a quantization/dequantization parameter value for each block unit, a prediction direction may be adaptively determined using not only quadtree-based zigzag scanning but also context information on neighboring blocks, thereby resolving subjective deterioration in image quality which may occur due to a substantial difference in quantization value from neighboring blocks.

DESCRIPTION OF DRAWINGS

FIG. 3 illustrates as for a context for controlling a quadtree-based quantization differential value recorded in a sequence parameter set according to the first exemplary embodiment of the present invention.

FIG. 4A illustrates as for variables set to initial values in slice data according to the first exemplary embodiment of the present invention.

FIG. 4B illustrates as for variables set to initial values in slice data according to the first exemplary embodiment of the present invention.

FIG. 5 illustrates as for a context of a quantization/dequantization parameter differential value stored by a CU and conditions in which the differential value exists according to the first exemplary embodiment of the present invention.

MODE FOR INVENTION

Hereinafter, quadtree-based adaptive quantization/dequantization parameter encoding and decoding apparatuses according to an exemplary embodiments of the present invention will be described with reference to the accompanying drawings.

Figure 1A:
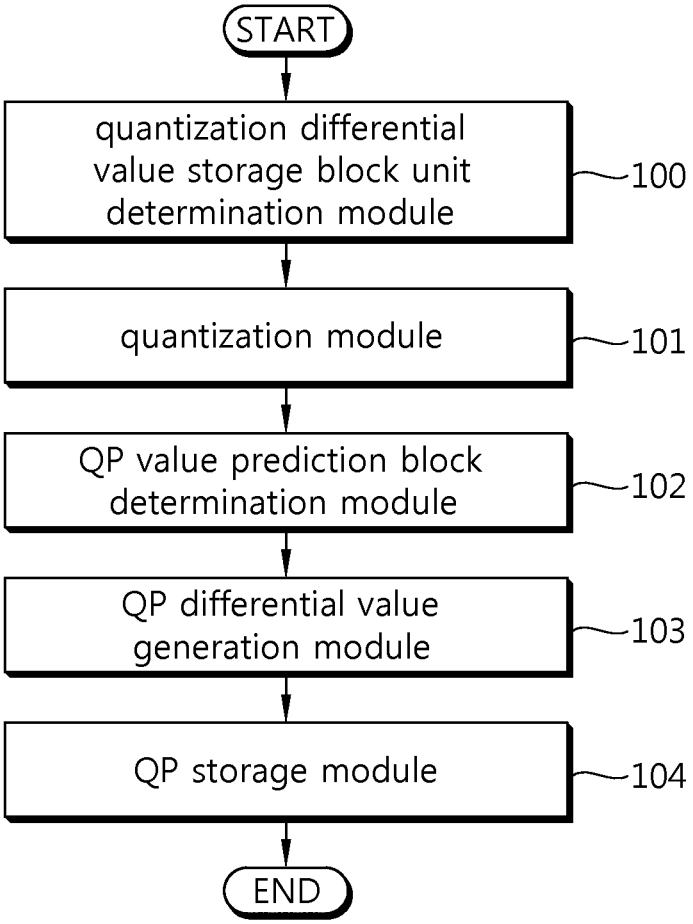
FIG. 1A illustrates as for a method and an apparatus for adaptively allocating a quantization parameter (QP) value to a block having a quadtree structure and encoding the QP value in a video encoding apparatus according a first exemplary embodiment of the present invention.

FIG. 1A illustrates a method and an apparatus for adaptively allocating a quantization parameter (QP) value to a block having a quadtree structure and encoding the QP value in a video encoding apparatus according a first exemplary embodiment of the present invention.

Referring to FIG. 1A, a quadtree-based adaptive quantization parameter encoding method and apparatus include a quantization differential value storage block unit determination module 100, a quantization module 101, a QP value prediction block determination module 102, a QP differential value generation module 103, and a QP storage module 104.

The quantization differential value storage block unit determination module 100 may determine a block unit to record a quantization differential value for each coding unit (CU) or a group of a plurality of CUs based on information on splitting of a largest coding unit (LCU) of a picture into CUs. Information on a block storing the quantization differential value may have a quadtree structure.

The quantization module 101 performs quantization on an input block using a QP value allocated to the block.

The QP value prediction block determination module 102 determines a prediction block to be used for prediction of a quantization value allocated to each CU or arbitrary CU using context information on a CU neighboring to the CU so as to effectively encode the quantization value. The context information may include a size of the block, a location of the block, and a prediction mode for the block.

The QP differential value generation module 103 generates a QP differential value by subtracting a quantization value of the current block from a QP value of the quantization value prediction block determined by the QP value prediction block determination module 102.

The QP storage module 104 serves to entropy-encode a sequence parameter set, flag information on application/non-application by a slice unit, flag information used to indicate splitting information on a block including a quantization differential value, and a QP differential value for quadtree-based adaptive QP encoding.

Figure 1B:
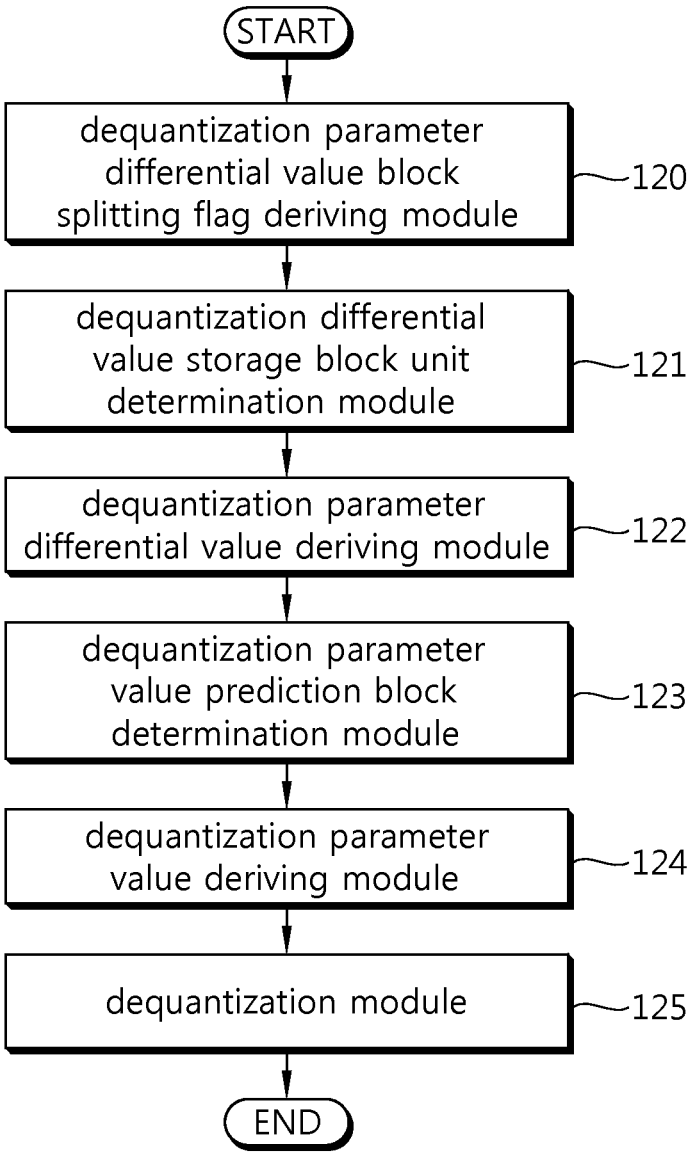
FIG. 1B illustrates as for a quadtree-based adaptive dequantization parameter decoding method and apparatus in a video decoding apparatus according the first exemplary embodiment of the present invention.

FIG. 1B illustrates a quadtree-based adaptive dequantization parameter decoding method and apparatus in a video decoding apparatus according the first exemplary embodiment of the present invention.

Referring to FIG. 1B, the quadtree-based adaptive dequantization parameter decoding method and apparatus includes a dequantization parameter differential value block splitting flag deriving module 120, a dequantization differential value storage block unit determination module 121, a dequantization parameter differential value deriving module 122, a dequantization parameter value prediction block determination module 123, a dequantization parameter value deriving module 124, and a dequantization module 125.

The dequantization parameter differential value block partition flag deriving module 120 decodes a sequence parameter set and a block partition flag for a block having a dequantization parameter differential value by an LCU in slice data.

The dequantization differential value storage block unit determination module 121 determines blocks to record dequantization parameter differential values using the decoded dequantization parameter differential value block splitting flag and a CU splitting flag. Information on a block to record a quantization differential value may have a quadtree structure.

The dequantization parameter differential value deriving module 122 derives a dequantization parameter differential value of each block determined by the dequantization differential value storage block unit determination module 121.

The dequantization parameter value prediction block determination module 123 derives determines a block for adaptive reference using context information on a neighboring block in dequantization. The context information may include a size of the block, a location of the block, and a prediction mode for the block.

The dequantization parameter value deriving module 124 derives a dequantization parameter value used for the dequantization module 125 by adding a dequantization parameter value of a prediction block derived by the dequantization parameter value prediction block determination module 123 and a dequantization parameter differential value derived by the dequantization parameter differential value deriving module 122.

The dequantization module 125 performs dequantization on the input block using the parameter derived by the dequantization parameter value deriving module 124.

Figure 2:
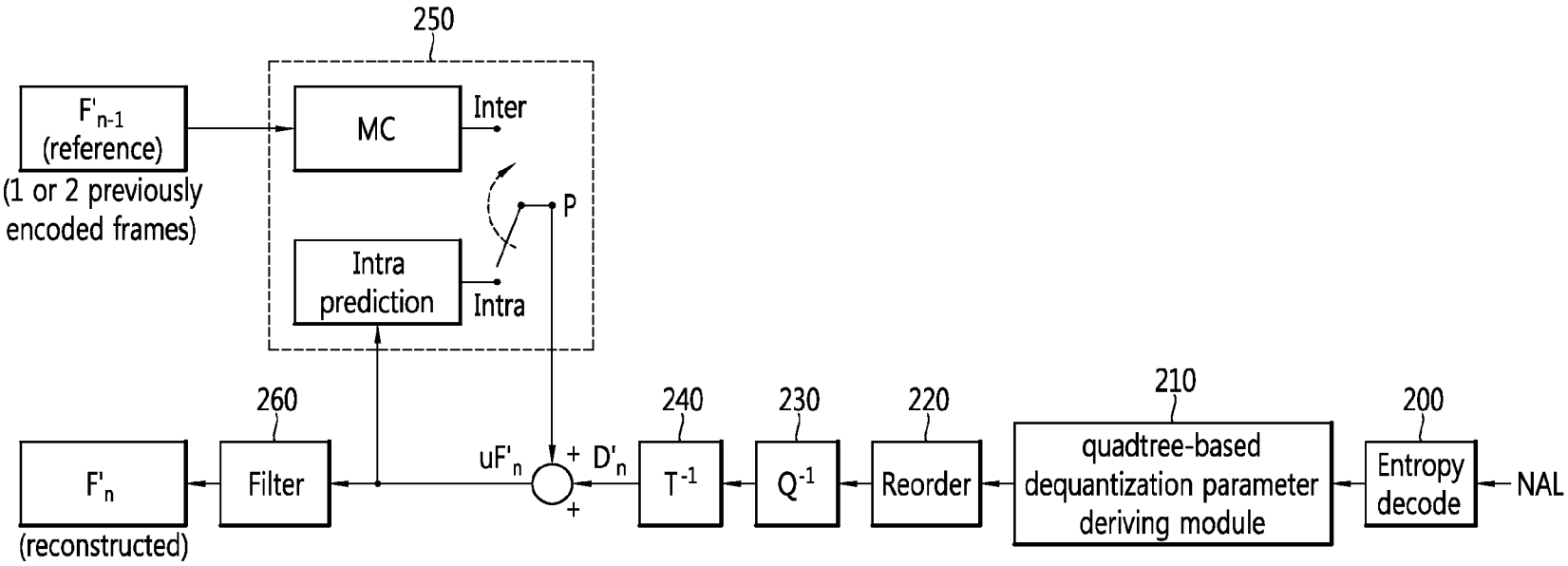
FIG. 2 illustrates as for a configuration of the video decoding apparatus according to the first exemplary embodiment of the present invention.

FIG. 2 illustrates a configuration of the video decoding apparatus according to the first exemplary embodiment of the present invention.

Referring to FIG. 2, the vide decoding apparatus includes an entropy-decoding module 200, a quadtree-based dequantization parameter deriving module 210, a rearrangement module 220, a dequantization module 230, an inverse discrete cosine transform encoding module 240, an intra/inter prediction module 250, and a filtering module 260.

The entropy-decoding module 200 includes the dequantization parameter differential value block splitting flag deriving module 120 to derive a block partition flag used for quadtree-based adaptive dequantization, the dequantization differential value storage block unit determination module 121 to determine a block storing a QP from the derived block splitting flag, and the dequantization parameter differential value deriving module 122 to decode a dequantization parameter differential value stored in a corresponding block.

The quadtree-based dequantization parameter deriving module 210 includes the dequantization parameter value prediction block determination module 123 to determine a prediction block for reference in decoding a dequantization parameter and the dequantization parameter value deriving module 124 to derive a dequantization parameter by adding a dequantization parameter of the prediction block and the derived dequantization parameter differential value.

FIG. 3 illustrates a context for controlling a quadtree-based quantization differential value stored in a sequence parameter set according to the first exemplary embodiment of the present invention.

When cu_qp_delta_enabled_flag 300 has a value of 1 in the sequence parameter set, quantization/dequantization parameter differential values of various quadtree blocks ranging from CUs of minimum size to CUs of maximum size in all slices in a sequence may be controlled.

FIG. 4A illustrates variables set to initial values in slice data according to the first exemplary embodiment of the present invention.

When a slice is split in a quadtree and encoded/decoded, the slice is first split into LCUs that are a quadtree of maximum size, which are then encoded/decoded in sequential scanning order. In encoding/decoding each LCU, an LCU may be further split into a plurality of CUs in a quadtree, and such splitting may be performed until CUs are partitioned into CUs of minimum size.

In FIG. 4A, is CuQpDeltaCoded 400 is a variable for controlling a quantization/dequantization parameter differential value which may be stored in each CU when an arbitrary CU is split into N CUs. This variable is always initialized to 0 before each LCU in the slice is encoded/decoded.

In FIG. 4A, coding_tree 401 is a function of performing encoding/decoding on one LCU in the slice. A fourth factor in this function is a flag indicating whether a quantization/de-quantization parameter differential value exists in a corresponding CU, and always imports a value of 1 before each LCU in the slice is encoded/decoded since at least one quantization/dequantization parameter differential value is stored in the LCU.

FIG. 4B illustrates a context of dequantization parameter differential value block splitting stored in a coding tree block according to the first exemplary embodiment of the present invention.

A coding tree block expresses a context of a CU. A CU having a 2N×2N size may be split into four CUs having an N×N size and encoded/decoded according to split_coding_unit_flag 420. Alternatively, the CU having a 2N×2N size may not be split into CUs of smaller size any more but be encoded/decoded as it is.

The current CU receives an input of a flag indicating whether a quantization/dequantization parameter differential value exists in a higher CU, that is, cu_qp_delta_exist_flag 421. When the current CU having a 2N×2N size is further split into CUs having an N×N size according to a value of split_coding_unit_flag 420, split_qp_delta_flag 422 is additionally encoded/decoded. Information on such additional splitting is encoded/decoded only when cu_qp_delta_enable_flag 300 stored in the sequence parameter set and cu_qp_delta_exist_flag 421 input from the higher CU have a value of 1. A value of split_qp_delta_flag 422 is encoded/decoded only when the current CU having a 2N×2N size is split into the CU having an N×N size, and is input as the value of cu_qp_delta_exist_flag 421 when the lower CUs having an N×N size are encoded/decoded.

When the value of split_qp_detla_flag 422 is 0, the current CU having a 2N×2N size is partitioned into the CUs having an N×N size but a block storing a quantization/dequantization parameter differential value is not split any more from a 2N×2N size to an N×N size. When the value of split_qp_detla_flag 422 is 0, a value of IsCuQpDeltaCoded 400 is additionally initialized to 0, so that a quantization/dequantization parameter differential value is stored only in a first N×N CU when the current CU is split into the CUs having N×N size.

FIG. 5 illustrates a context of a quantization/dequantization parameter differential value stored by a CU and conditions in which the differential value exists according to the first exemplary embodiment of the present invention.

When a CU is not in a skip mode, a quantization/dequantization parameter differential value may be recorded in the CU. When a value of cu_qp_delta_exist_flag 500 and 421 is 1, a quantization/dequantization parameter differential value exists in the current CU, in which case a value of cu_qp_delta 501 may be stored by a CU according to a value of cu_qp_delta_enabled_flag 300 stored in the sequence parameter set. For example, when the value of cu_qp_delta_exist_flag 500 and 421 is 1 and the value of cu_qp_delta_enabed_flag 300 is 0, cu_qp_delta 501 is not stored.

Alternatively, when a 2N×2N CU is split into four N×N CUs in a quadtree, only one quantization/dequantization parameter differential value may be stored. In this case, the quantization/dequantization parameter differential value is stored in a first CU among the four CUs, while the other three CUs do not record the quantization/dequantization parameter differential value. Here, since the value of split_qp_delta_flag 422 encoded/decoded in the 2N×2N CU is 0, the value of cu_qp_delta_exist_flag 500 input to the N×N CU is 0. Thus, although no cu_qp_delta 501 basically exists in the split four N×N CUs, a value of cu_qp_delta 501 may be stored in a first N×N CU using a variable NIsCuQpDeltaCoded. The value of cu_qp_delta 501 is not stored in the other three CUs since the first CU changes the value of IsCuQpDeltaCoded to 1 after decoding cu_qp_delta 501.

Even in this case, the value of cu_qp_delta 501 may be stored only when the value of cu_qp_delta_enabled_flag 300 stored in the sequence parameter set is 1, simultaneously checking the value of cu_qp_delta_enabled_flag 300.

Figure 6A:
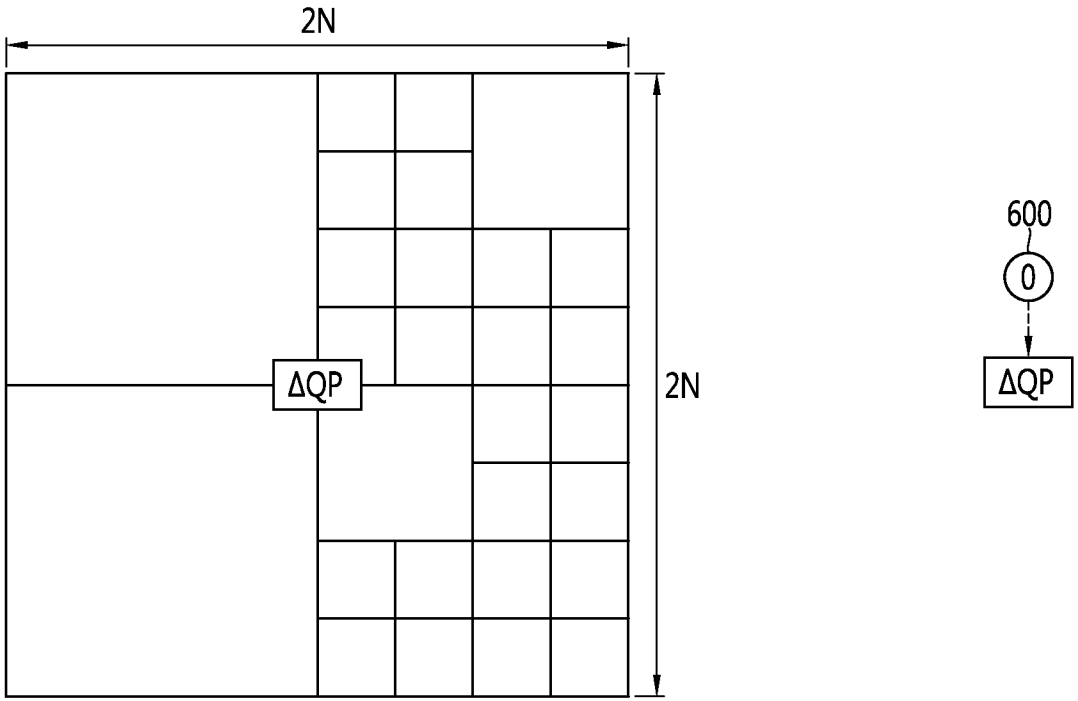
FIG. 6A illustrates as for operations in a quantization differential value storage block unit determination module and a dequantization differential value storage block unit determination module according to an exemplary embodiment of the present invention.

FIG. 6A illustrates operations of the quantization differential value storage block unit determination module 100 and the dequantization differential value storage block unit determination module 121 according to the first exemplary embodiment of the present invention.

A 2N×2N LCU to encode/decode may be split into four N×N CUs, each of which may be further partitioned to be processed. Even though the 2N×2N LCU is partitioned into a plurality of CUs to be encoded/decoded, when split_qp_delta_flag 422 has a value of 0 as shown in FIG. 6A, a quantization/dequantization parameter differential value is stored in a first CU of the LCU. A quantization/dequantization parameter value reconstructed in the first CU may be used for the other CUs of the LCU.

Figure 6B:
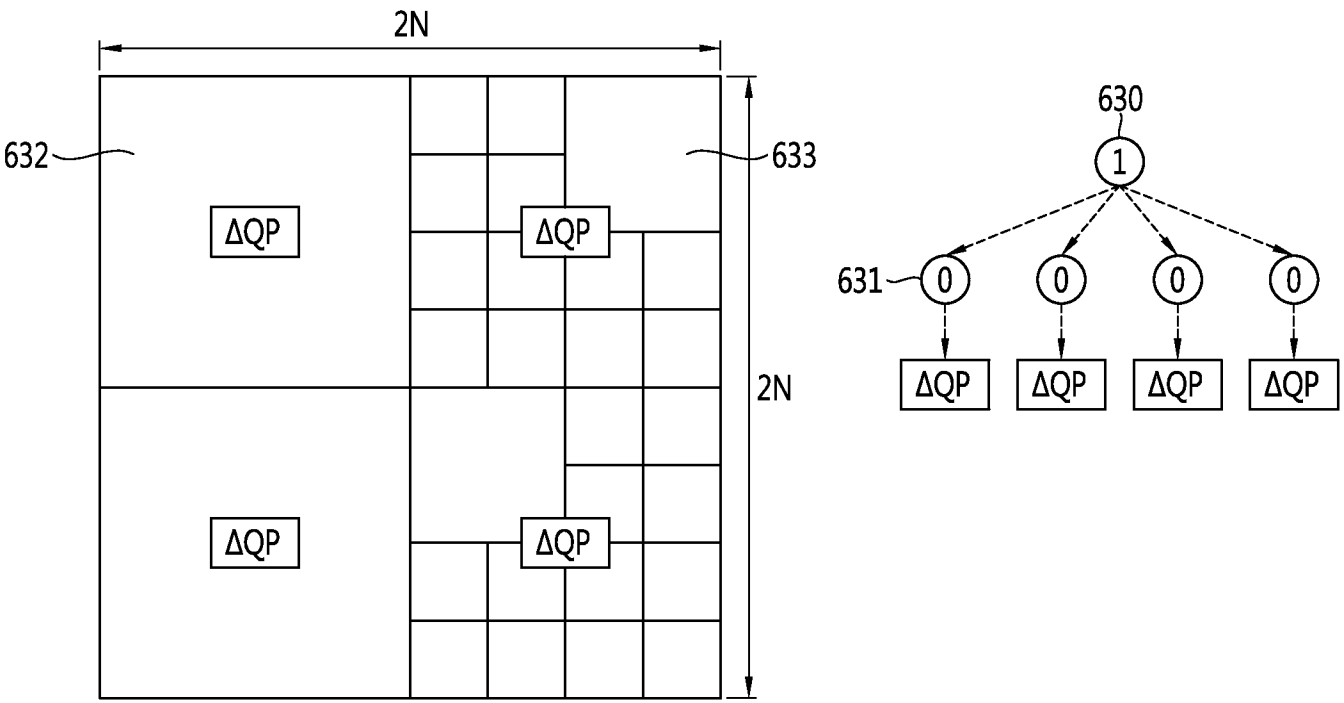
FIG. 6B illustrates as for operations in a quantization differential value storage block unit determination module and a dequantization differential value storage block unit determination module according to an exemplary embodiment of the present invention.

FIG. 6B illustrates operations of the quantization differential value storage block unit determination module 100 and the dequantization differential value storage block unit determination module 121 according to a second exemplary embodiment of the present invention.

A 2N×2N LCU to encode/decode is split into four CUs in a first stage, a second CU of which is further split. In this instance, when a flag indicating splitting into the CUs is encoded/decoded in the first stage, a splitting flag with respect to a quantization/dequantization parameter value, which is split_qp_delta_flag 422 and 631, is additionally encoded/decoded. When a value of split_qp_delta_flag 422 and 631 is 1, all four split CUs have a quantization/dequantization parameter differential value, and thus the splitting flag with respect to the quantization/dequantization parameter value, split_qp_delta_flag 422 and 631, is additionally encoded/decoded.

Even in this case, although the second N×N CU is split into CUs until a third stage, the block splitting flag for quantization/dequantization, split_qp_delta_flag 422 and 631, is 0, and thus a single quantization/dequantization parameter value is allocated for a plurality of CUs.

Figure 6C:
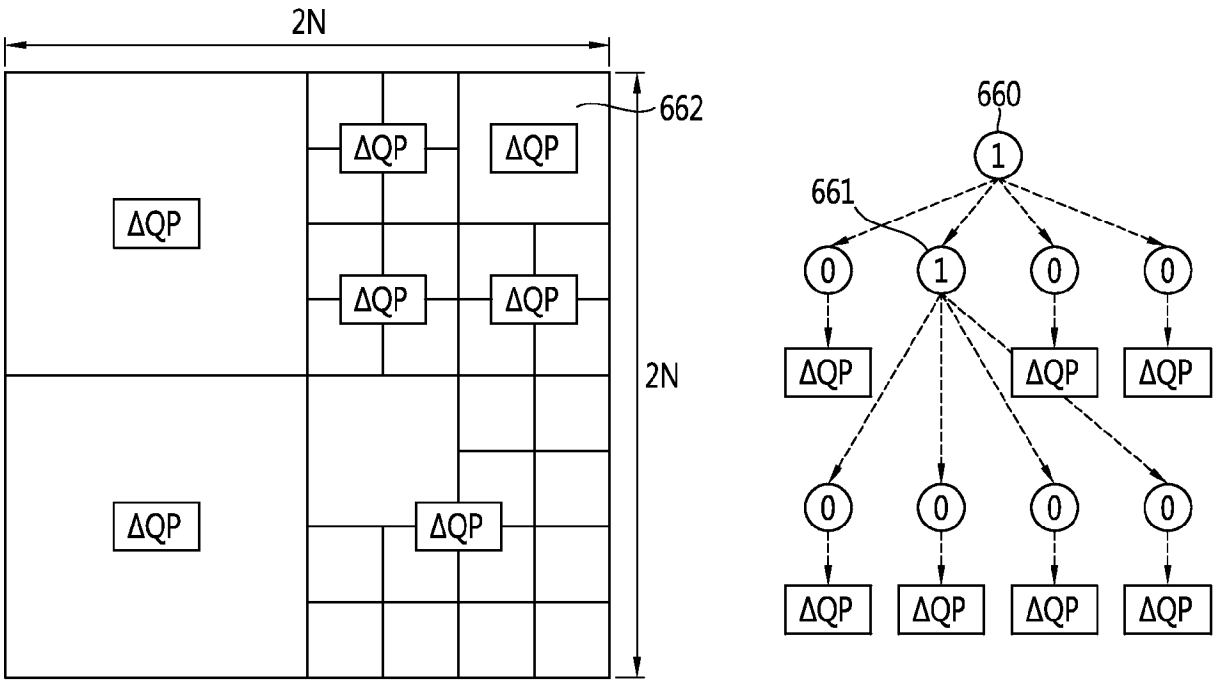
FIG. 6C illustrates as for operations in a quantization differential value storage block unit determination module and a dequantization differential value storage block unit determination module according to an exemplary embodiment of the present invention.

FIG. 6C illustrates operations of the quantization differential value storage block unit determination module 100 and the dequantization differential value storage block unit determination module 121 according to a third exemplary embodiment of the present invention.

FIG. 6C shows that a 2N×2N LCU to encode/decode is split into four CUs in a first stage, a second CU of which is further split. Even when the second CU is split into four CUs, each of which is further partitioned into four CUs, a size of a block to record a quantization/dequantization parameter differential value may be determined using a value of split_qp_delta_flag 422 and 661. In FIG. 6C, a CU is split to regions with up to three depth informations, while the quantization/dequantization parameter differential value has relatively up to two depth informations.

Figure 7A:
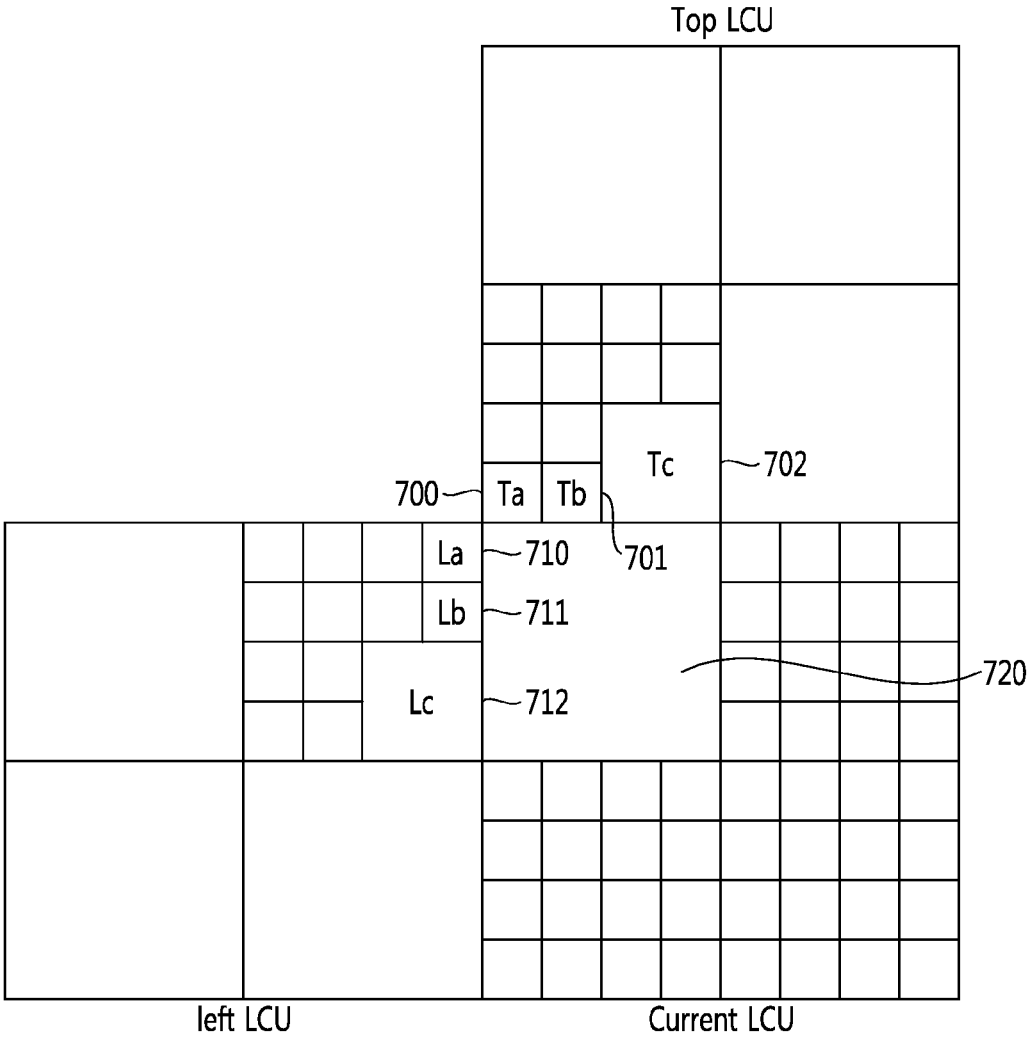
FIG. 7A illustrates as for operations in a QP value prediction block determination module and a dequantization parameter value prediction block determination module according to the first exemplary embodiment of the present invention.

FIG. 7A illustrates the QP value prediction block determination module 102 and the dequantization parameter value prediction block determination module 123 according to the first exemplary embodiment of the present invention.

An encoder allocates a QP value to CU blocks determined by the quantization differential value storage block unit determination module 100 and employs a previously used QP value for remaining blocks as it is. Here, the QP value is predicted from a QP value for previous blocks, and only a QP different value is encoded.

A decoder decodes a dequantization parameter differential value in the dequantization parameter differential value deriving module 122 and derives a dequantization parameter value by adding the differential value with a dequantization parameter value of a block used for prediction.

The QP value prediction block determination module 102 and the dequantization parameter value prediction block determination module 123 serve to determine a neighboring block for reference when the encoder and the decoder predict a QP value of a current block.

In FIG. 7A, when a CU 720 to encode/decode is allocated a quantization/dequantization parameter value, the parameter value is predicted using an average value, minimum value or maximum value of QP values of CUs 712 and 702 or Lc and Tc having a largest block size located on each boundary among CUs 710, 711 and 712 or La, Lb and Lc located on a left boundary of the current CU 720 and CUs 700, 701 and 702 or Ta, Tb and Tc located on an upper boundary of the current CU 720.

Figure 7B:
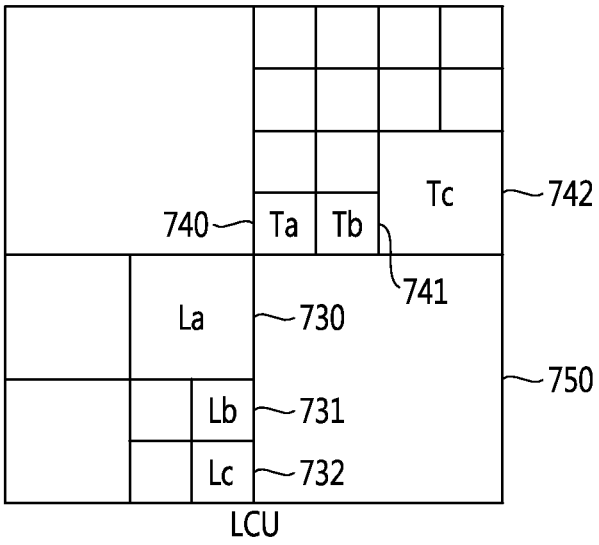
FIG. 7B illustrates as for operations in a QP value prediction block determination module and a dequantization parameter value prediction block determination module according to the first exemplary embodiment of the present invention.

FIG. 7B illustrates the QP value prediction block determination module 102 and the dequantization parameter value prediction block determination module 123 according to an alternative example of the first exemplary embodiment of the present invention.

When an LCU is split into a plurality of CUs to be encoded/decoded, a QP value of a current CU 750 to encode/decode is predicted using an average value, minimum value or maximum value of QP values of two CUs having a largest block size located on a left boundary and an upper boundary of the current CU 750 among CUs neighboring to the current CU 750.

Figure 8A:
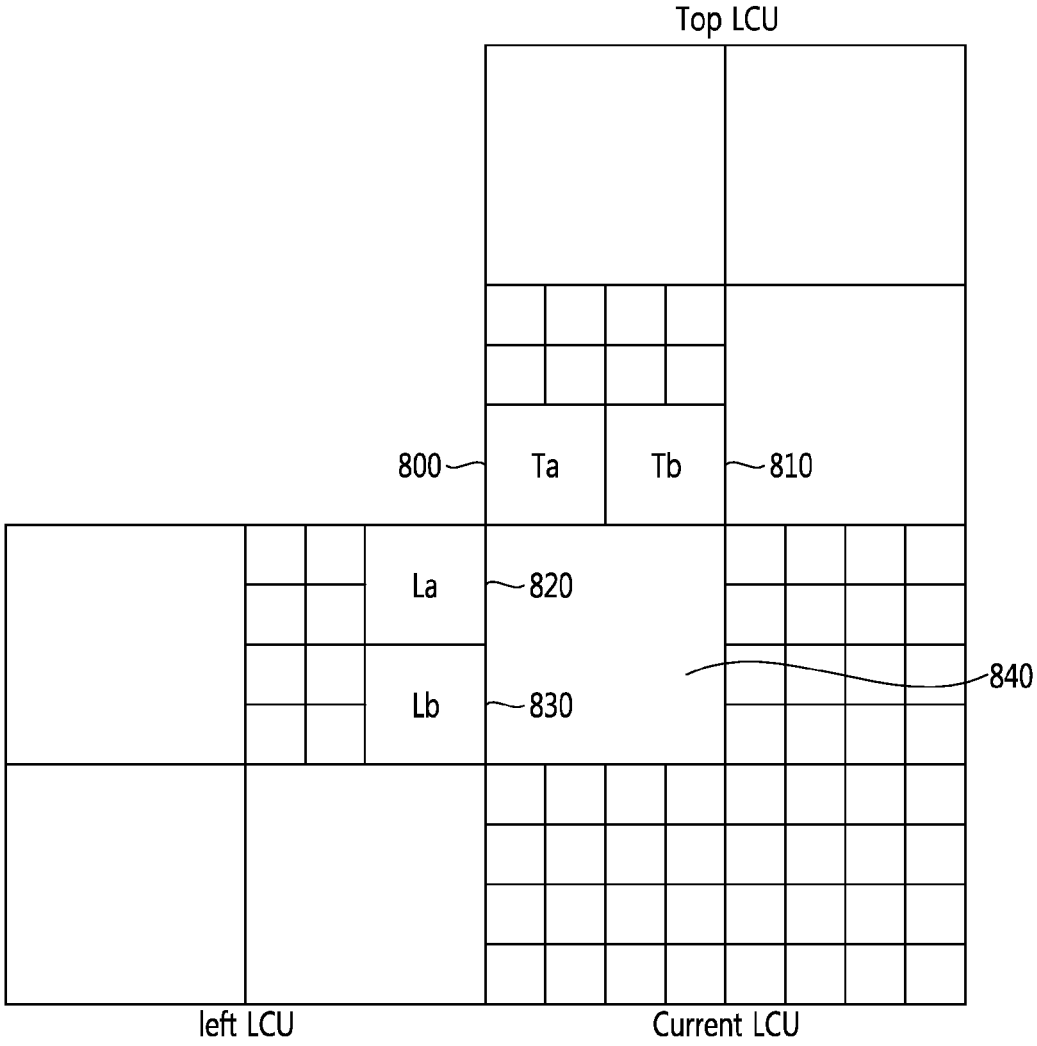
FIG. 8A illustrates as for operations in a QP value prediction block determination module and a dequantization parameter value prediction block determination module according to a second exemplary embodiment of the present invention.

FIG. 8A illustrates the QP value prediction block determination module 102 and the dequantization parameter value prediction block determination module 123 according to a second exemplary embodiment of the present invention.

When a QP value of a current CU 840 to encode/decode is predicted, a CU having a largest block size among CUs neighboring to the current CU is used for reference. In this case, when there are a plurality of CUs having a largest block size, an average value, minimum value or maximum value of QP values of CUs is used to predict the QP value of the current CU 840, the CUs including a top CU 820 or La selected among CUs on a left boundary of the current CU 840 and a leftmost CU 800 or Ta preferentially used for reference among CUs on an upper boundary thereof.

Figure 8B:
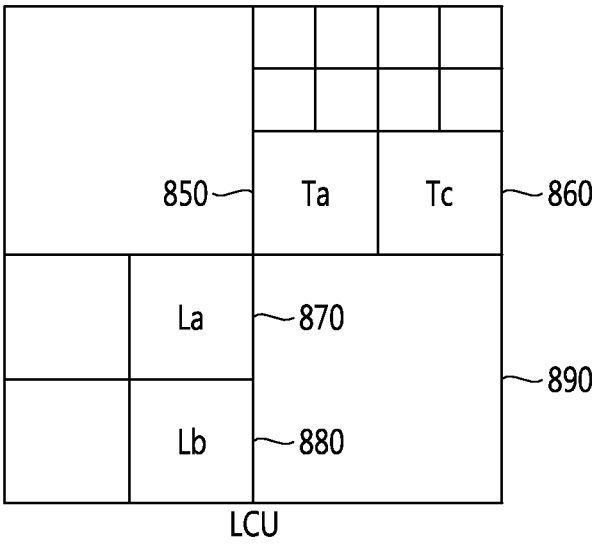
FIG. 8B illustrates as for operations in a QP value prediction block determination module and a dequantization parameter value prediction block determination module according to a second exemplary embodiment of the present invention.

FIG. 8B illustrates the QP value prediction block determination module 102 and the dequantization parameter value prediction block determination module 123 according to an alternative example of the second exemplary embodiment of the present invention.

When an LCU is split into a plurality of CUs to be encoded/decoded, a QP value of a current CU 890 to encode/decode is predicted using CUs having a largest block size for reference among CUs neighboring to the current CU 890. Here, when there are a plurality of CUs having a largest block size on a left boundary of the current CU 890, a top CU 870 or La is used as a reference block. Likewise, when there are a plurality of CUs having a largest block size on an upper boundary of the current CU 890, a leftmost CU 850 or Ta is used as a reference block. When the reference blocks on the left and top boundaries are determined, the QP value of the current CU 890 to encode/decode is predicted using an average value, minimum value or maximum value of QP values of these two CUs.

Figure 9A:
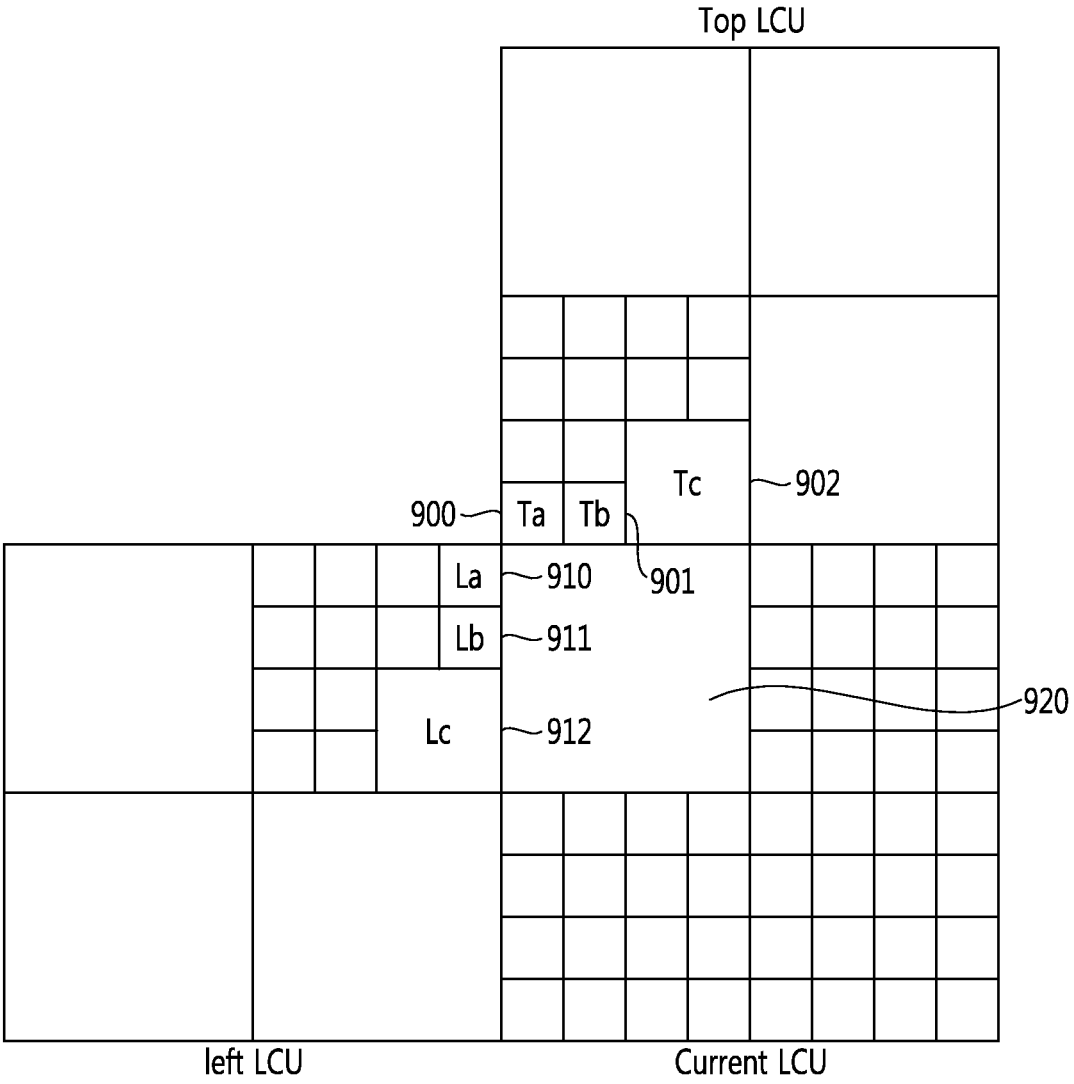
FIG. 9A illustrates as for operations in a QP value prediction block determination module and a dequantization parameter value prediction block determination module according to a third exemplary embodiment of the present invention.

FIG. 9A illustrates the QP value prediction block determination module 102 and the dequantization parameter value prediction block determination module 123 according to a third exemplary embodiment of the present invention.

When a QP value of a current CU 920 to encode/decode is predicted, all possible reference CUs 900, 901, 902, 910, 911 and 912 or Ta, Tb, Tc, La, Lb and Lc neighboring to the current CU are selected as reference blocks. The encoder predicts the QP value of the current CU 920 to encode using an average value, minimum value or maximum value of QP values of all possible reference CUs and encodes a QP differential value.

The decoder decodes a dequantization parameter value of the CU 920 to decode by adding the decoded QP differential value with an average value, minimum value or maximum value of dequantization parameter values of all possible reference CUs.

Figure 9B:
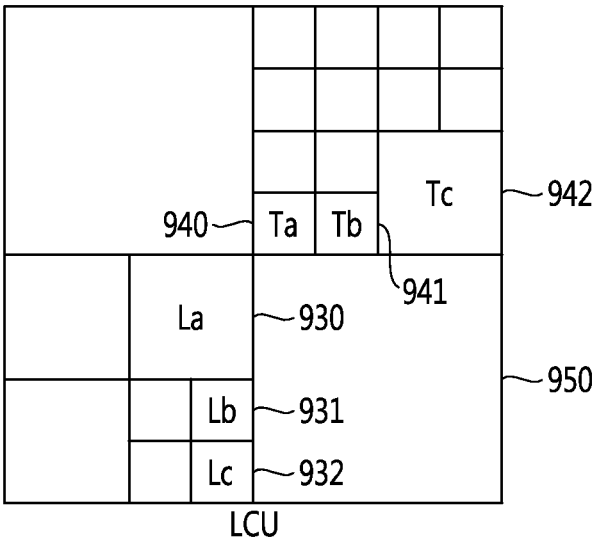
FIG. 9B illustrates as for operations in a QP value prediction block determination module and a dequantization parameter value prediction block determination module according to a third exemplary embodiment of the present invention.

FIG. 9B illustrates the QP value prediction block determination module 102 and the dequantization parameter value prediction block determination module 123 according to an alternative example of the third exemplary embodiment of the present invention.

When a CU 950 to encode/decode is located in an LCU, a QP value of the CU 950 is predicted using all possible reference CUs 930, 931, 932, 940, 941 and 942 or La, Lb, Lc, Ta, Tb and Tc neighboring to the current CU.

The encoder predicts the QP value of the current CU 950 to encode using an average value, minimum value or maximum value of QP values of all adjacent possible reference CUs and encodes a QP differential value therebetween only.

The decoder decodes a dequantization parameter value of the CU 950 to decode by adding the decoded QP differential value with an average value, minimum value or maximum value of dequantization parameter values of all adjacent possible reference CUs.

Figure 10A:
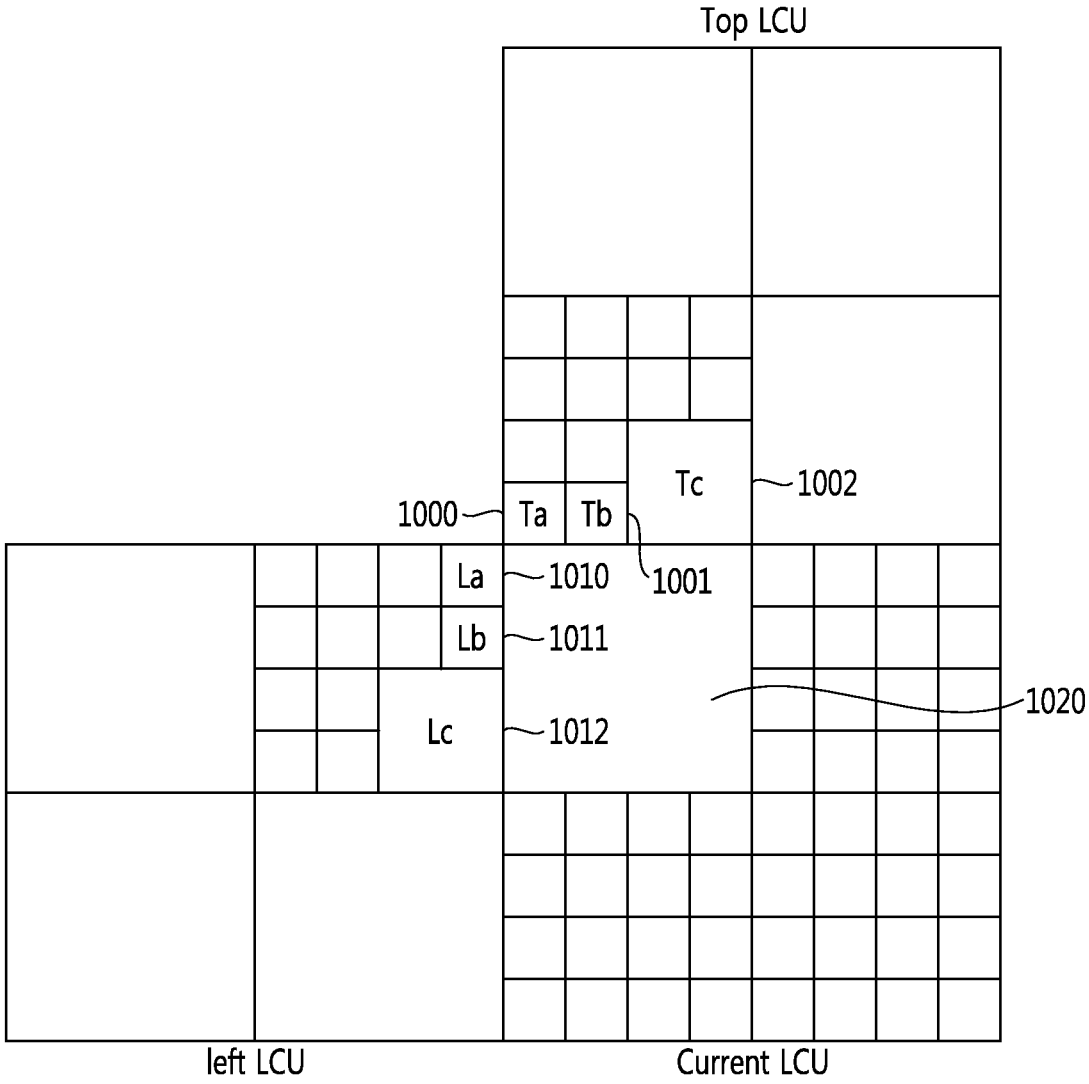
FIG. 10A illustrates as for operations in a QP value prediction block determination module 102 and a dequantization parameter value prediction block determination module 123 according to a fourth exemplary embodiment of the present invention.

FIG. 10A illustrates an operation in the QP value prediction block determination module 102 and the dequantization parameter value prediction block determination module 123 according to a fourth exemplary embodiment of the present invention.

When a CU 1020 located on a boundary between LCUs is encoded/decoded, a CU 1012 or Lc having a largest block size among possible reference CUs 1010, 1011 and 1012 or La, Lb and Lc located on a left boundary of the current CU 1020 is used for reference. Here, when there are one or more CUs having a largest block size among the possible reference CUs on the left boundary, a top CU is selected as a reference block.

The encoder predicts a QP value of the CU 1020 to encode using a QP value of the CU 1012 or Lc selected on the left boundary as the reference block and encodes a QP differential value therebetween.

The decoder decodes a dequantization parameter differential value of the CU 1020 to decode and adds the differential value with a dequantization parameter value of the CU 1012 or Lc, thereby decoding a dequantization parameter value of the CU 1020.

Figure 10B:
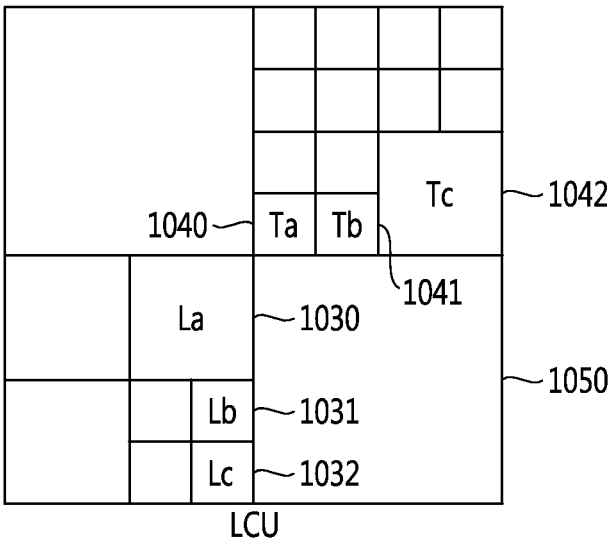
FIG. 10B illustrates as for operations in a QP value prediction block determination module 102 and a dequantization parameter value prediction block determination module 123 according to a fourth exemplary embodiment of the present invention.

FIG. 10B illustrates an operation in the QP value prediction block determination module 102 and the dequantization parameter value prediction block determination module 123 according to an alternative example of the fourth exemplary embodiment of the present invention.

When an LCU is split into a plurality of CUs to be encoded/decoded, a CU 1030 or La having a largest block size among CUs 1030, 1031 and 1032 or La, Lb and Lc located on a left boundary of a CU 1050 to encode/decode is used for reference. Here, when there are one or more CUs having a largest block size among the CUs on the left boundary, a top CU 1030 or La is selected as a reference block.

The encoder predicts a QP value of the CU 1050 to encode using a QP value of the CU 1030 or La selected on the left boundary as the reference block and encodes a QP differential value therebetween.

The decoder decodes a dequantization parameter differential value of the CU 1050 to decode and adds the differential value with a dequantization parameter value of the CU 1030 or La, thereby decoding a dequantization parameter value of the CU 1050.

Figure 11A:
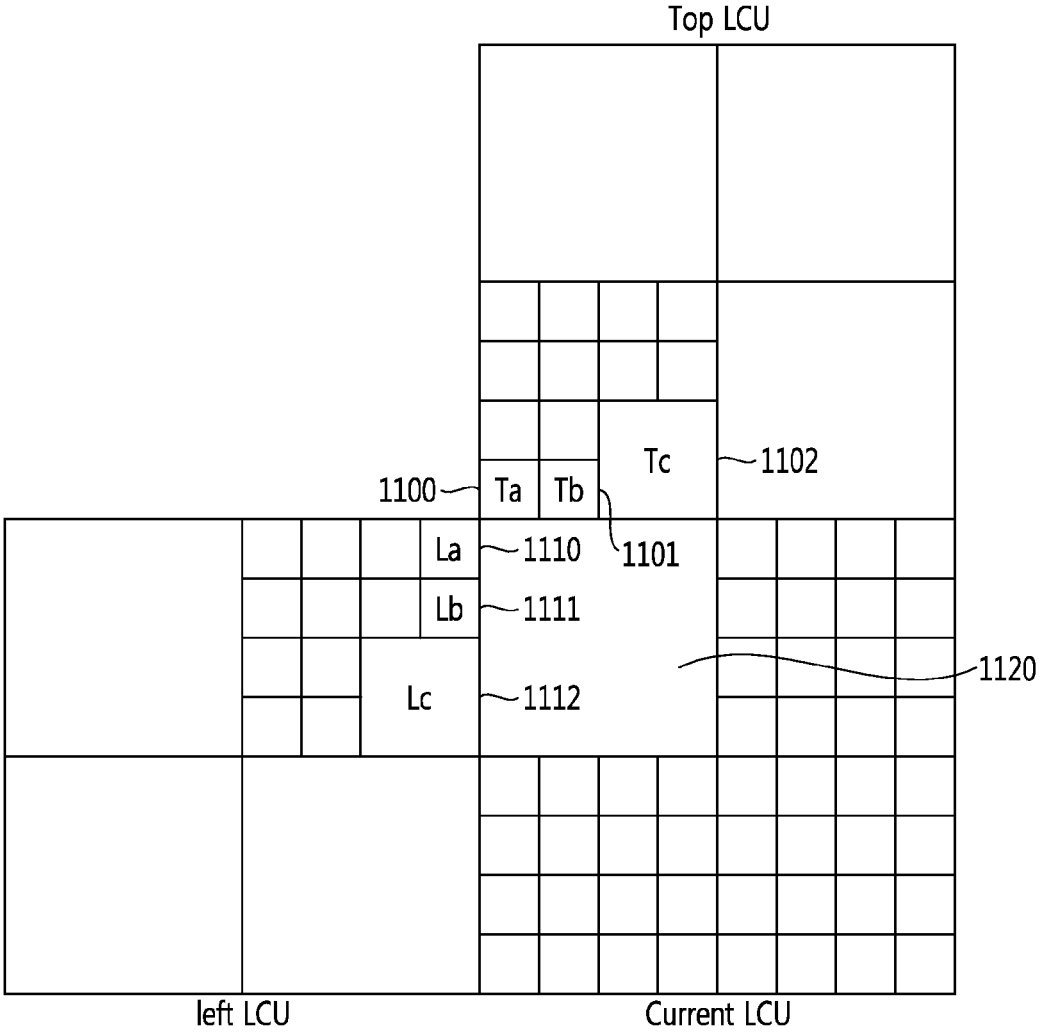
FIG. 11A illustrates as for operations in a QP value prediction block determination module and a dequantization parameter value prediction block determination module according to a fifth exemplary embodiment of the present invention.

FIG. 11A illustrates an operation in the QP value prediction block determination module 102 and the dequantization parameter value prediction block determination module 123 according to a fifth exemplary embodiment of the present invention.

When a CU 1120 located on a boundary between LCUs is encoded/decoded, all possible reference CUs 1110, 1111 and 1112 or La, Lb and Lc located on a left boundary of the current CU 1220 are used as reference blocks.

The encoder predicts a QP value of the CU 1120 to encode using an average value, minimum value or maximum value of QP values of all possible reference CUs 1110, 1111 and 1112 or La, Lb and Lc located on the left boundary and encodes a QP differential value.

The decoder decodes a dequantization parameter differential value of the CU 1120 to decode and decodes a dequantization parameter value of the CU 1120 to decode by adding the differential value with an average value, minimum value or maximum value of dequantization parameter values of all possible reference CUs 1110, 1111 and 1112 or La, Lb and Lc.

Figure 11B:
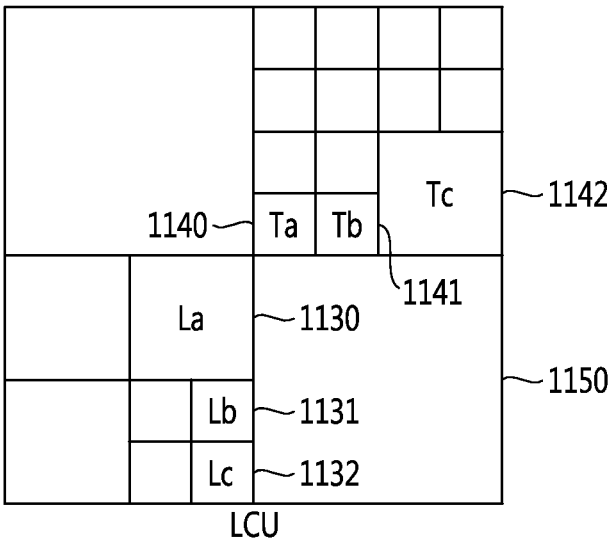
FIG. 11B illustrates as for operations in a QP value prediction block determination module and a dequantization parameter value prediction block determination module according to a fifth exemplary embodiment of the present invention.

FIG. 11B illustrates an operation in the QP value prediction block determination module 102 and the dequantization parameter value prediction block determination module 123 according to an alternative example of the fifth exemplary embodiment of the present invention.

When an LCU is split into a plurality of CUs to be encoded/decoded, all possible reference CUs located on a left boundary of a CU 1150 to encode/decode are used as reference blocks.

The encoder predicts a QP value of the CU 1150 to encode using an average value, minimum value or maximum value of QP values of all possible reference CUs located on the left boundary and encodes a QP differential value.

The decoder decodes a dequantization parameter differential value of the CU 1150 to decode and decodes a dequantization parameter value of the CU 1150 to decode by adding the differential value with an average value, minimum value or maximum value of dequantization parameter values of all possible reference CUs located on the left boundary.

The invention claimed is:

[1. A method for decoding a video by a decoding apparatus using derivation of a dequantization parameter, the method comprising:

determining a parameter recorded unit for which dequantization parameter information is signaled, wherein the parameter recorded unit is split in a quadtree structure;

determining a parameter prediction unit used for deriving a predicted dequantization parameter, wherein the parameter prediction unit comprises the parameter recorded unit;

deriving the predicted dequantization parameter for the parameter prediction unit, wherein the predicted dequantization parameter is derived using an average value of dequantization parameters of a block neighboring to a left of the parameter prediction unit and a block neighboring above the parameter prediction unit;

deriving a differential dequantization parameter for the parameter recorded unit based on the dequantization parameter information;

deriving the dequantization parameter using a sum of the predicted dequantization parameter and the differential dequantization parameter; and performing dequantization using the dequantization parameter.]

[2. The method of claim 1, wherein the parameter prediction unit is a block which has a size same with one of a coding unit size from size of smallest coding unit to size of largest coding unit when a quantization parameter flag has a value of true, and wherein the quantization parameter flag indicates whether information with which the dequantization parameter is predicted for coding unit is present or not.]

[3. The method of claim 1, wherein splitting information is a split flag, and wherein the parameter recorded unit is split into blocks of lower depth in a quadtree structure when the split flag is equal to 1, and the parameter recorded unit is not split further when the split flag is equal to 0.]

[4. The method of claim 1, wherein splitting information is a split flag, wherein the split flag equal to 0 indicates that the differential dequantization parameter is signaled for the parameter recorded unit and the split flag equal to 1 indicates that the parameter recorded unit is split into sub-blocks and the differential dequantization parameter is not signaled for the parameter recorded unit, and wherein split flags for the sub-blocks are signaled when the split flag is equal to 1.]

*5. A method for decoding a video by a decoding apparatus using derivation of a dequantization parameter, the method comprising:*

*determining a unit image block for parameter recording for which dequantization parameter information is signaled, wherein the unit image block for parameter recording is split in a quadtree structure;*

*determining a unit image block for parameter predicting, used for deriving a predicted dequantization parameter, wherein the unit image block for parameter predicting comprises the unit image block for parameter recording;*

*deriving the predicted dequantization parameter for the unit image block for parameter predicting, wherein the predicted dequantization parameter is derived using dequantization parameters of a plurality of blocks neighboring to the unit image block for parameter predicting;*

*deriving a differential dequantization parameter for the unit image block for parameter recording based on the dequantization parameter information;*

*deriving the dequantization parameter using a sum of the predicted dequantization parameter and the differential dequantization parameter; and*

*performing dequantization using the dequantization parameter.*

*6. The method of claim 5,*

*wherein the unit image block for parameter predicting is a block which has a size same with one of a coding unit size from a size of a smallest coding unit to a size of a largest coding unit when a quantization parameter flag has a value of true, and*

*wherein the quantization parameter flag indicates whether information with which the dequantization parameter is predicted for a coding unit is present or not.*

*7. A method for encoding a video by an encoding apparatus using encoding of a dequantization parameter, the method comprising:*

*determining a parameter recorded unit for which dequantization parameter information is signaled, wherein the parameter recorded unit is split in a quadtree structure;*

*determining a parameter prediction unit used for deriving a predicted dequantization parameter, wherein the parameter prediction unit comprises the parameter recorded unit;*

*deriving the predicted dequantization parameter for the parameter prediction unit, wherein the predicted dequantization parameter is derived using dequantization parameters of a block neighboring to a left of the parameter prediction unit and a block neighboring above the parameter prediction unit;*

*deriving a differential dequantization parameter for the parameter recorded unit by subtracting the predicted dequantization parameter from a dequantization parameter for the parameter recorded unit; and*

*encoding the differential dequantization parameter as the dequantization parameter information for the parameter recorded unit,*

*wherein the quadtree structure splits a block into four sub-blocks with half horizontal size.*

*8. The method of claim 7,*

*wherein the parameter prediction unit is a block which has a size same with one of a coding unit size from a size of a smallest coding unit to a size of a largest coding unit when a quantization parameter flag has a value of true, and*

*wherein the quantization parameter flag indicates whether information with which the dequantization parameter is predicted for a coding unit is present or not.*

*9. A method for transmitting a bitstream generated by an encoding method performed by an encoding apparatus, the encoding method comprising:*

*determining a unit image block for parameter recording for which dequantization parameter information is signaled, wherein the unit image block for parameter recording is split in a quadtree structure;*

*determining a unit image block for parameter predicting used for deriving a predicted dequantization parameter, wherein the unit image block for parameter predicting comprises the unit image block for parameter recording;*

*deriving the predicted dequantization parameter for the unit image block for parameter predicting, wherein the predicted dequantization parameter is derived using dequantization parameters of a plurality of blocks neighboring to the unit image block for parameter predicting;*

*deriving a differential dequantization parameter for the unit image block for parameter recording by subtracting the predicted dequantization parameter from a dequantization parameter for the unit image block for parameter recording; and*

*encoding the differential dequantization parameter as the dequantization parameter information for the unit image block for parameter recording.*

*10. The method of claim 9,*

*wherein the unit image block for parameter predicting is a block which has a size same with one of a coding unit size from a size of a smallest coding unit to a size of a largest coding unit when a quantization parameter flag has a value of true, and*

*wherein the quantization parameter flag indicates whether information with which the de quantization parameter is predicted for a coding unit is present or not.*

* * * * *